(12) United States Patent
Tsai

(10) Patent No.: US 8,109,479 B1
(45) Date of Patent: Feb. 7, 2012

(54) MULTI-VACUUM MOUNT TYPE SUPPORT DEVICE

(76) Inventor: Wen-Feng Tsai, Taipei (TW)

( * ) Notice: Subject to any disclaimer, the term of this patent is extended or adjusted under 35 U.S.C. 154(b) by 15 days.

(21) Appl. No.: 12/804,593

(22) Filed: Jul. 26, 2010

(51) Int. Cl.
*A45D 42/14* (2006.01)

(52) U.S. Cl. .................................. 248/206.3; 248/205.5

(58) Field of Classification Search .................. 248/683, 248/467, 205.5, 206.2, 206.3, 309.3, 276.1, 248/282.1, 284.1, 289.11, 291.1; 269/21
See application file for complete search history.

(56) References Cited

U.S. PATENT DOCUMENTS

| | | | | |
|---|---|---|---|---|
| 3,180,604 A * | 4/1965 | Hammer | ..................... | 248/205.8 |
| 3,430,954 A * | 3/1969 | Massey | ........................... | 482/38 |
| 5,975,183 A * | 11/1999 | Reis et al. | ..................... | 156/580 |
| 6,817,145 B2 * | 11/2004 | Chen | ........................... | 52/127.2 |
| 7,857,268 B2 * | 12/2010 | Chiu | ........................... | 248/206.3 |
| 2008/0111037 A1 * | 5/2008 | Carnevali | ..................... | 248/206.2 |

* cited by examiner

*Primary Examiner* — A. Joseph Wujciak, III

(57) ABSTRACT

A multi-vacuum mount type support device includes a multi-end connection bar, multiple supporting arms each having one end thereof horizontally pivotally connected to a respective end of the multi-end connection bar by a respective pivot lock, multiple vacuum mount assemblies vertically pivotally connected to the other ends of the supporting arms by respective pivot lock for securing to a flat surface by a vacuum suction force, and a mount connected to one front end of the multi-end connection to hold a holder member for holding an electronic apparatus.

5 Claims, 5 Drawing Sheets

MULTI-VACUUM MOUNT TYPE SUPPORT DEVICE

BACKGROUND OF THE INVENTION

1. Field of the Invention

The present invention to a support device for holding an electronic apparatus and more particularly, to a multi-vacuum mount type support device that uses multiple vacuum mount assemblies far mounting on flat surface by means of vacuum suction and, which allows easy adjustment of the supported object to different elevations and angles.

2. Description of the Related Art

Many different vacuum mount type support devices have been disclosed for supporting a mobile telephone, mobile multimedia player, computer, or any of a variety of electronic apparatus on a flat surface, and have appeared on the market. These conventional vacuum mount type support devices do not allow easy adjustment of the elevation and angle of the supported object. Further, due to the use of one single vacuum mount, the support device may fall down easily upon a vibration or accidental impact.

SUMMARY OF THE INVENTION

The present invention has been accomplished to provide a multi-vacuum mount type support device, which eliminates the drawbacks of the prior art design. It is therefore the main object of the present invention to provide a multi-vacuum mount type support device, which uses multiple vacuum mount assemblies for mounting a flat surface by means of vacuum suction. It is another object of the present invention to provide a multi-vacuum mount type support device, which allows easy adjustment of the supported object to different elevations and angles.

To achieve these and other objects of the present invention, a multi-vacuum mount type support device comprises a multi-end connection bar; a plurality of supporting arms, each supporting arm having opposing first end and second end, the first ends of the supporting arms being horizontally pivotally connected to one respective end of the multi-end connection bar by a respective pivot lock; a plurality of vacuum mount assemblies vertically pivotally connected to the second ends of the supporting arms by a respective pivot lock, each the vacuum mount assembly comprising a multilateral upright shaft, a vacuum mount base member formed of a rubber disk having a flat polyurethane pad bonded to a bottom side thereof, and a vacuum mount cap member capped on the vacuum mount base member and rotatable between a first position where the vacuum mount base member is caused to produce a suction force and to be firmly secured to a flat surface to which the vacuum mount base member is attached and a second position where the vacuum mount base member releases the vacuum and is movable from the flat surface; and a mount connected to one front end of the multi-end connection bar and releasably locked thereto by a pivot lock for holding a load.

DETAILED DESCRIPTION OF THE PREFERRED EMBODIMENT

Figure 1:
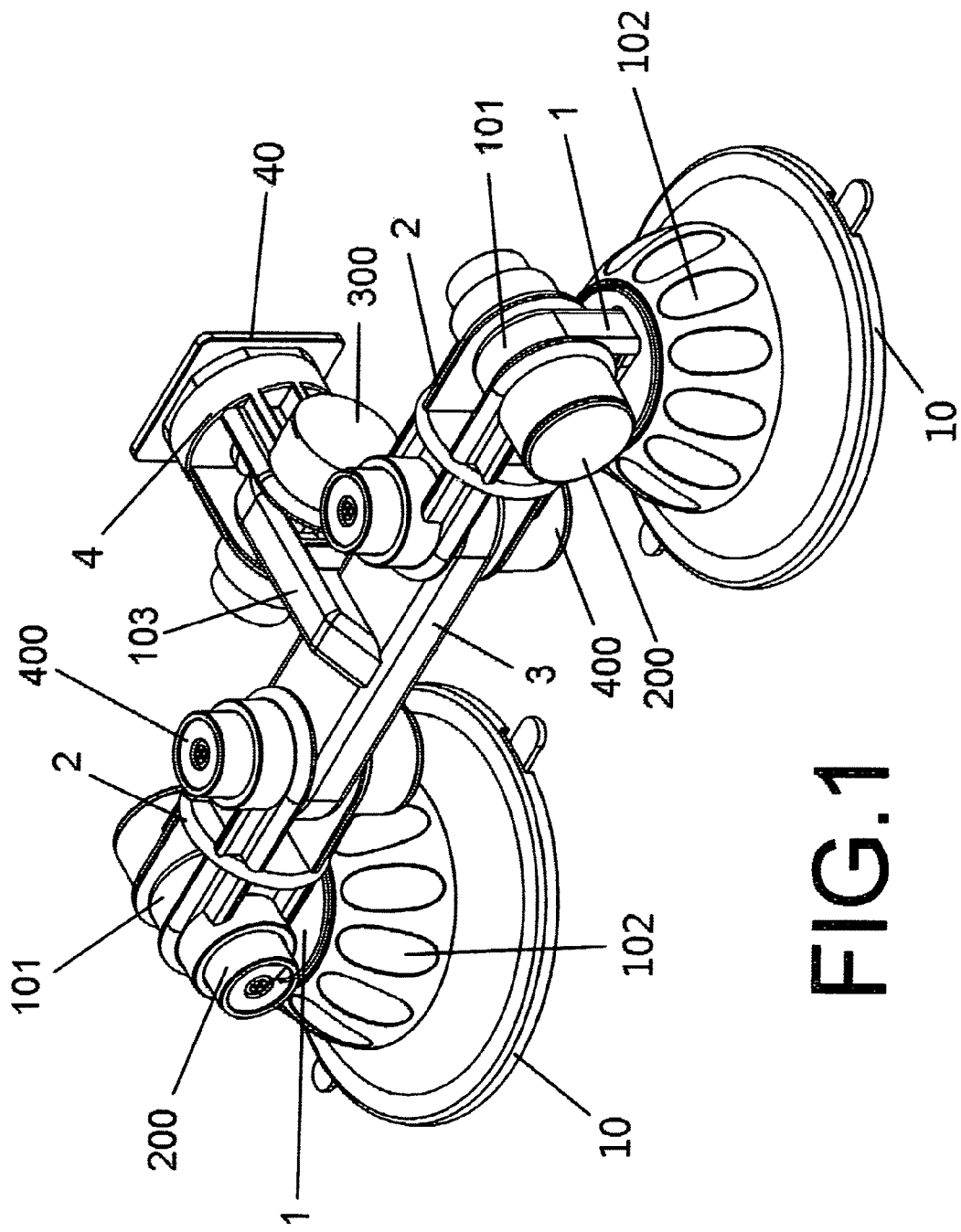
FIG. 1 is an elevational view of a multi-vacuum, mount type support device in accordance with the present invention.
Figure 2:
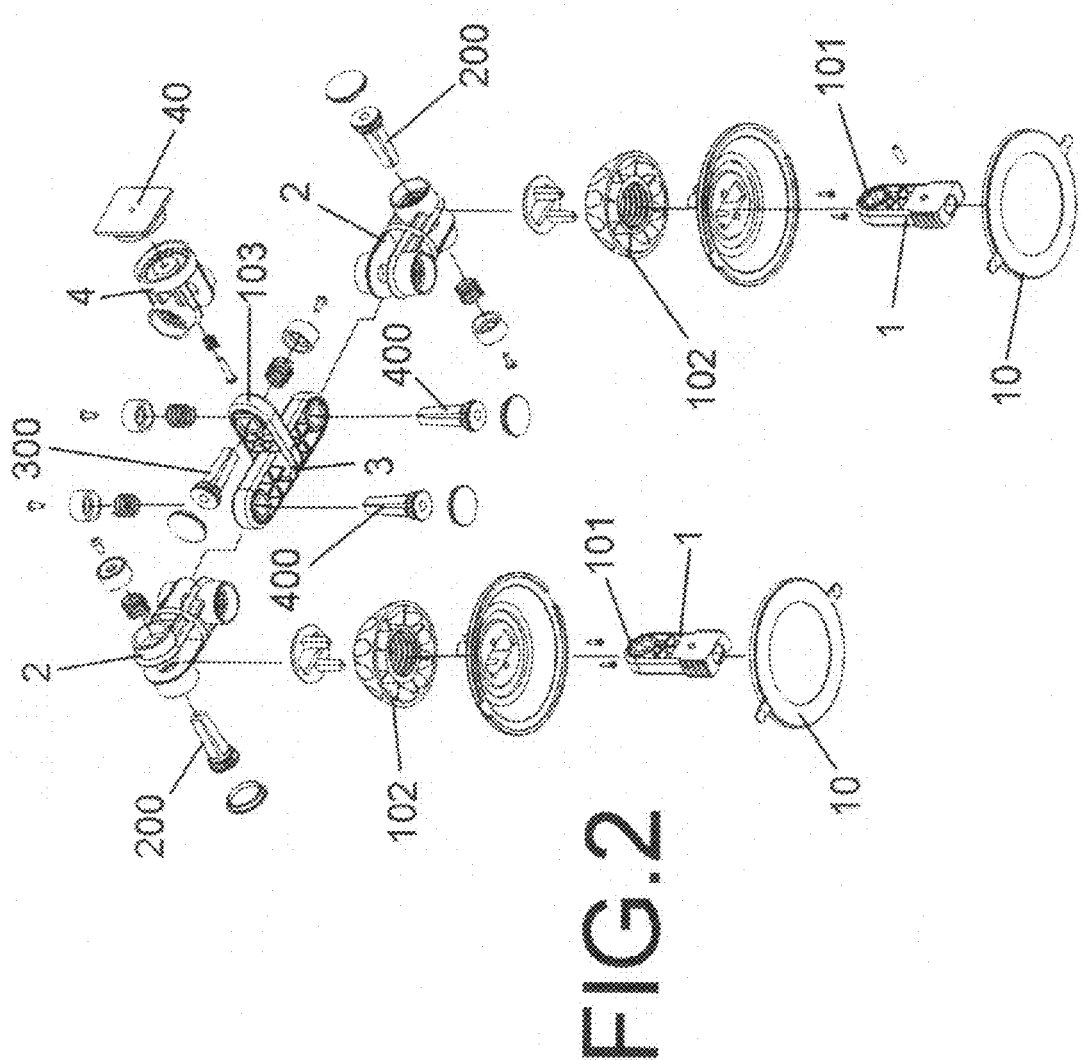
FIG. 2 is an exploded view of the multi-vacuum mount type support device shown in FIG. 1.
Figure 3:
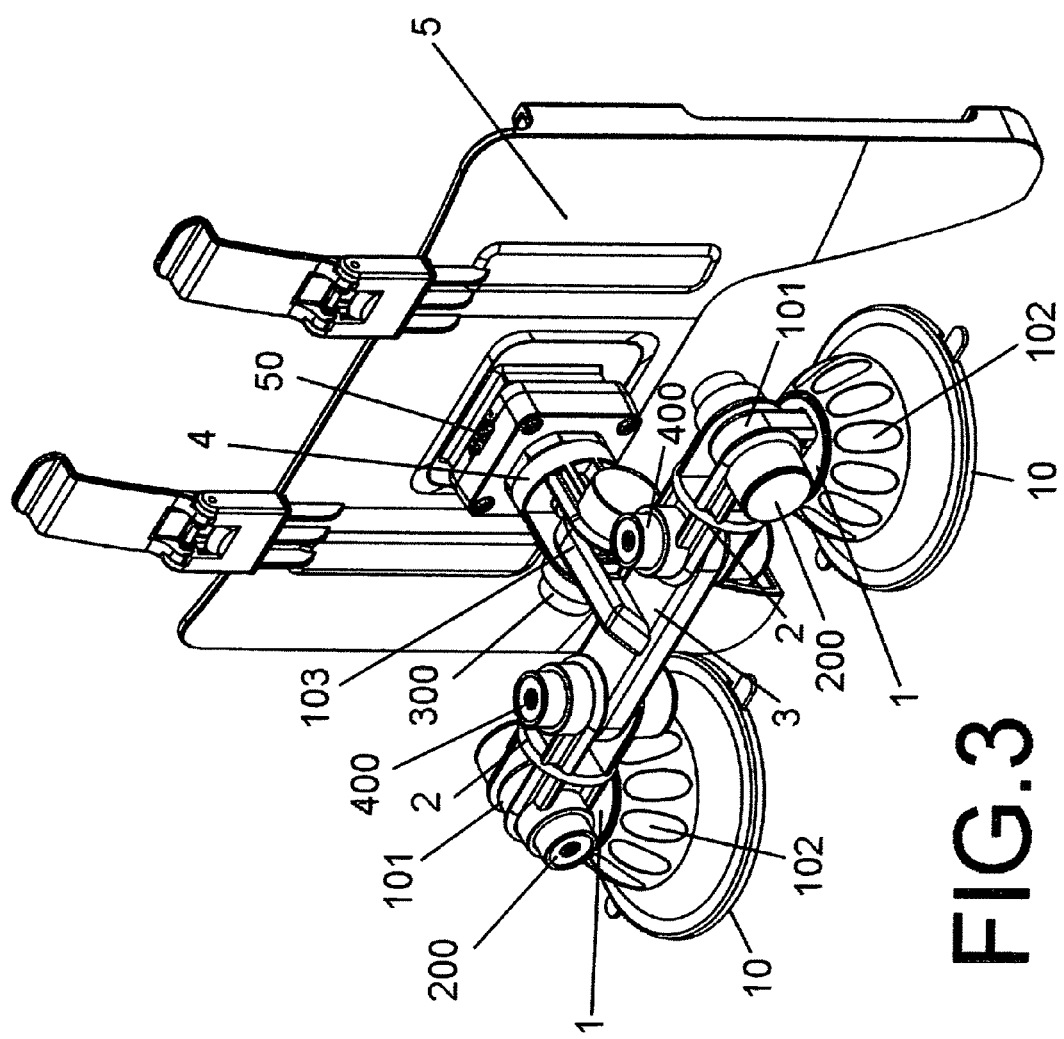
FIG. 3 is an applied view of the present invention, showing a holder member fastened to the front panel of the mount.
Figure 4:
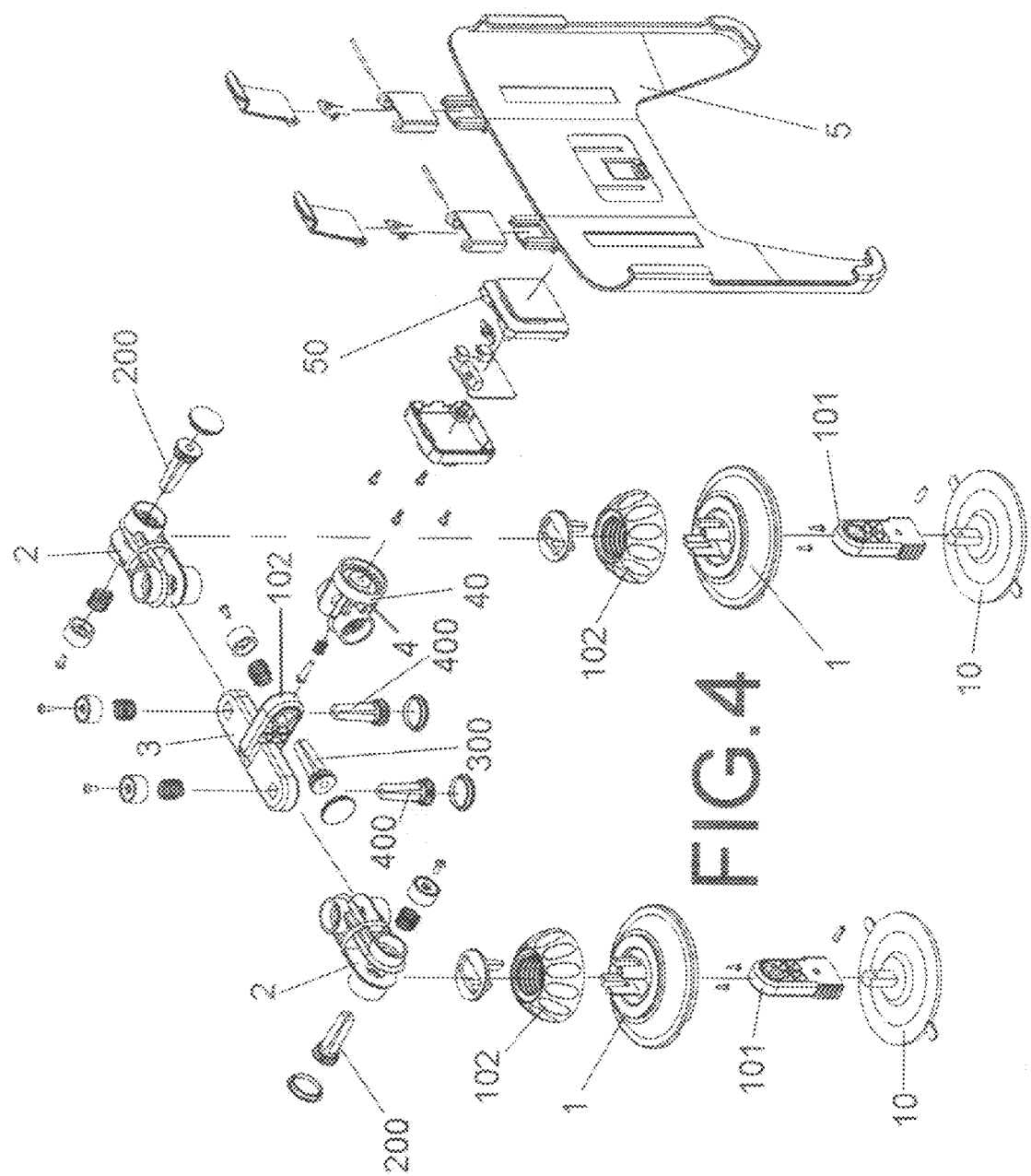
FIG. 4 is an exploded view of FIG. 3.

Referring to FIGS. 1~5, a multi-vacuum mount type support device in accordance with the present invention is shown comprising a plurality of vacuum mount assemblies 1, a multi-end connection bar 3, a plurality of supporting arms 2, a plurality of first pivot locks 200, a plurality of second pivot locks 400, a third pivot lock 300 and a mount 4.

Each vacuum mount assembly 1 comprises a multilateral upright shaft 101, a vacuum mount base member 10 that is a rubber disk having a flat polyurethane pad bonded to the bottom side thereof and a vacuum mount cap member 102 capped on the vacuum mount base member 10 and rotatable between a first position where the vacuum mount base member 10 is caused to produce a suction force and to be firmly secured to the flat surface to which the vacuum mount base member 10 is attached and a second position where the vacuum mount base member 10 releases the vacuum and is movable from the flat surface.

The vacuum mount assemblies 1 are respectively and vertically pivotally connected to one end of each of the supporting arms 2 and releasably locked thereto by the first pivot locks 200.

The other ends of the supporting arms 2 are respectively and horizontally pivotally connected to the multi-end connection bar 3 at different locations and releasably locked thereto by the second pivot locks 400.

The mount 4 is vertically pivotally connected to the front end 103 and releasably locked thereto by the third pivot lock 300, having a front panel 40 for the mounting of a holder member 5 that is adapted to hold a mobile telephone, mobile media player, computer, . . . , or any of a variety of other electronic apparatus. The holder member 5 carries a power socket 50 for the connection of a power cable. Further, the front panel 40 can be rotatably adjustably arranged at the front side of the mount 4 for the mounting of the holder member 5.

When using the multi-vacuum mount type support device to support an electronic apparatus, the user can operate the vacuum mount cap members 102 of the vacuum mount assemblies 1 to secure the vacuum mount assemblies 1 to a flat surface, and then rotate the first pivot locks 200 and the second pivot locks 400 to adjust the elevation and angle of the multi-end connection bar 3, a third pivot lock 300 and a mount 4, and then operate the third pivot lock 300 to adjust the elevation of the mount 4 and the holder member 5, thereby adjusting the supported electronic apparatus to the desired elevation and angular position.

Figure 5:
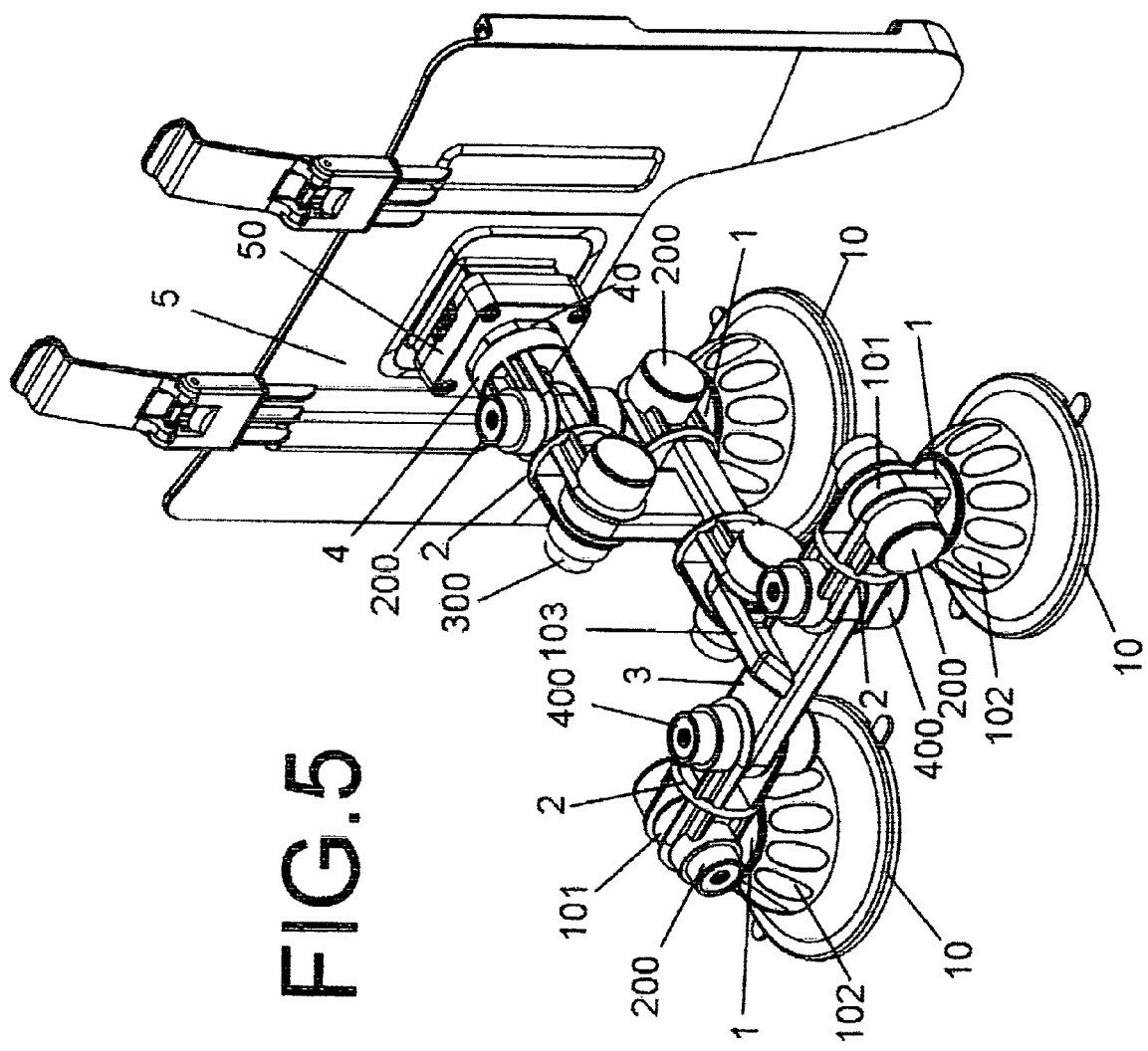
FIG. 5 is an elevational view of an alternate form of the multi-vacuum mount type support device in accordance with the present invention.

FIG. 5 shows an alternate form of the present invention. This alternate form is substantially similar to the embodiment shown in FIGS. 1~4 with the exception of that three vacuum mount assemblies 1 are respectively and vertically pivotally connected to the multi-end connection bar 3.

Although particular embodiments of the invention have been described in detail for purposes of illustration, various modifications and enhancements may be made, without departing from the spirit and scope of the invention. Accordingly, the invention is not to be limited except as by the appended claims.

What is claimed is:

1. A multi-vacuum mount type support device, comprising:
a multi-end connection bar;

a plurality of supporting arms, each said supporting arm having opposing first end and second end, said first ends of said supporting arms being horizontally pivotally connected to one respective end of said multi-end connection bar a respective pivot lock;

to a plurality of vacuum mount assemblies vertically pivotally connected to said second ends of said supporting arms by a respective pivot lock, each said vacuum mount assembly comprising a multilateral upright shaft, a vacuum mount base member formed of a rubber disk having a flat polyurethane pad bonded to a bottom side thereof, and a vacuum mount cap member capped on said vacuum mount base member and rotatable between a first position where said vacuum mount base member is caused to produce a suction force and to be firmly secured to a flat surface to which said vacuum mount base member is attached and a second position where said vacuum mount base member releases said vacuum and is movable from said flat surface; and a mount connected to one front end of said multi-end connection bar and releasably locked thereto by a pivot lock for holding a load.

2. The multi-vacuum mount type support device as claimed in claim 1, wherein said supporting arms are respectively connected to said multi-end connection bar different elevations.

3. The multi-vacuum mount type support device as claimed in claim 1, wherein said, multi-end connection bar has multiple ends disposed at different elevations and extending in different directions for the connection of said supporting arms.

4. The multi-vacuum mount type support device as claimed in claim 1, wherein said mount comprises a front panel, and a holder member fastened to said front panel and adapted to hold an electronic apparatus.

5. The multi-vacuum mount type support device as claimed in claim 4, wherein said holder member carries a power socket for the connection of a power cable.

\* \* \* \* \*